(12) United States Patent
Cleveland (10) Patent No.: US 8,320,623 B2
(45) Date of Patent: Nov. 27, 2012

(54) SYSTEMS AND METHODS FOR 3-D TARGET LOCATION

(75) Inventor: Dixon Cleveland, Annandale, VA (US)

(73) Assignee: LC Technologies, Inc., Fairfax, VA (US)

( * ) Notice: Subject to any disclaimer, the term of this patent is extended or adjusted under 35 U.S.C. 154(b) by 329 days.

(21) Appl. No.: 12/817,569

(22) Filed: Jun. 17, 2010

(65) Prior Publication Data

US 2010/0322479 A1  Dec. 23, 2010

Related U.S. Application Data

(60) Provisional application No. 61/187,864, filed on Jun. 17, 2009.

(51) Int. Cl.
*G06K 9/00* (2006.01)
*H04N 7/18* (2006.01)

(52) U.S. Cl. .............. 382/103; 382/291; 348/78

(58) Field of Classification Search .......... 382/100, 382/103, 106, 107, 154, 162, 168, 173, 181, 382/232, 254, 274, 276, 286, 291, 305, 312; 348/78; 600/558; 359/630; 351/159.39
See application file for complete search history.

(56) References Cited

U.S. PATENT DOCUMENTS

| | | | | |
|---|---|---|---|---|
| 6,120,461 | A * | 9/2000 | Smyth | 600/558 |
| 6,130,957 | A * | 10/2000 | Horikoshi et al. | 382/107 |
| 6,269,170 | B1 * | 7/2001 | Horikoshi et al. | 382/100 |
| 6,369,952 | B1 * | 4/2002 | Rallison et al. | 359/630 |
| 6,857,741 | B2 * | 2/2005 | Blum et al. | 351/159.39 |
| 2010/0321482 | A1 * | 12/2010 | Cleveland | 348/78 |

* cited by examiner

*Primary Examiner* — Seyed Azarian
(74) *Attorney, Agent, or Firm* — John R. Kasha; Kasha Law LLC (57) ABSTRACT

A target is imaged in a three-dimensional real space using two or more video cameras. A three-dimensional image space combined from two video cameras of the two or more video cameras is displayed to a user using a stereoscopic display. A right eye and a left eye of the user are imaged as the user is observing the target in the stereoscopic video display, a right gaze line of the right eye and a left gaze line of the left eye are calculated in the three-dimensional image space, and a gazepoint in the three-dimensional image space is calculated as the intersection of the right gaze line and the left gaze line using a binocular eyetracker. A real target location is determined by translating the gazepoint in the three-dimensional image space to the real target location in the three-dimensional real space from the locations and the positions of the two video cameras using a processor.

18 Claims, 7 Drawing Sheets

FIG. 1

| CAMERA CONTROL SETTINGS | EYEGAZE DIRECTION | GAZE CONVERGENCE/PARALLAX | EYE PUPIL DIAMETER | HEAD PAN/TILT ANGLE | HEAD ROLL ANGLE | HEAD HORZ/VERT POSITION | HEAD LONGITUDINAL POSITION |
|---|---|---|---|---|---|---|---|
| PAN/TILT ANGLE | ✓ | | | ✓ | | ✓ | |
| ROLL ANGLE | | | | | ✓ | | |
| HORZ/VERT POSITION | | | | ✓ | | ✓ | |
| LONGITUDINAL POSITION | | | | | | | ✓ |
| ZOOM | | ✓ | | ✓ | | | ✓ |
| FOCUS/CONVERGENCE | | ✓ | | ✓ | | | ✓ |
| SEPARATION | | ✓ | | ✓ | | | ✓ |
| ILLUMINATION/IRIS | | | ✓ | | | | ✓ |

SYSTEMS AND METHODS FOR 3-D TARGET LOCATION

CROSS-REFERENCE TO RELATED APPLICATION

This application claims the benefit of U.S. Provisional Patent Application No. 61/187,864 filed Jun. 17, 2009.

INTRODUCTION

1. Field of the Invention

Embodiments of the present invention relate to systems and methods for remote three-dimensional target location. More particularly, embodiments of the present invention relate to systems and methods for remotely determining the location of a target in a three-dimensional real space by tracking the eyes of user viewing a stereoscopic image of the target in a three-dimensional image space.

2. Background Information

A key goal in modern arthroscopic surgery is to allow the surgeon to identify the three-dimensional (3-D) location of objects he cannot see directly. A key goal of future combat systems is to keep a soldier out of harm's way. It is desirable to let a soldier fight from far away, while giving him all the information he would get if he were close in. Remote video sensors allow observers to see and detect targets without personally being on the scene. A key limitation of current remote display systems is that the observer cannot see in 3-D. 3-D information is critical for determining the range to a target.

BRIEF DESCRIPTION OF THE DRAWINGS

The skilled artisan will understand that the drawings, described below, are for illustration purposes only. The drawings are not intended to limit the scope of the present teachings in any way.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Remote Camera Control

As described above, a robot operator must control multiple robotic systems simultaneously. Traditionally, a robot operator has used his hands to control all of these systems. In various embodiments, systems and methods provide a robot operator means to control remote vision systems without using his hands, which are typically occupied in controlling the robot itself. When using remote vision in robotic applications, it is often desirable for the operator to be able to control the robot vision system as if he were controlling his own eyes at the scene.

In various embodiments, a camera's pan and tilt angles are manipulated in direct response to the operator's own eye orientations. In this manner, the camera automatically rotates to point directly toward the object the operator is looking at on his display screen. Additionally, eye and/or head movements may be used to direct other camera activity such as camera roll; zoom; x, y and z position with respect to the host platform; camera separation and convergence angle in stereoscopic cameras; lens iris or aperture; and scene illumination. Minimum or no hand control of the camera is required.

Based on the operation of our own eyes and head, it is fully natural to control the activity of a remote camera system based on our eye or head activity. When we want to look right, we naturally rotate our eyes and head to the right. When we want to examine something closely, we move our head in to get a more detailed visual image. When we want a more expansive view, we often move our head back. When we need more light, we open our pupils, although this is an unconscious activity. In various embodiments, methods for controlling remote video cameras are based on the natural eye or head activities of the system operator and include velocity modes of control, combinations of eye and head movements, and the control of stereoscopic cameras.

In this discussion, eye or head "activity variables" are defined as the set of all the dynamic head and eye activities that a user exercises in the course of looking at things. Eye or head activity variables include, but are not limited to, eye rotation (pan and tilt angles), gaze convergence, pupil constriction and dilation, head rotation (pan, tilt and roll), and head translation (horizontal, vertical, and longitudinal).

In this discussion, "camera control settings" refer to the set of the video camera's controllable parameters, including, but not limited to, pan, tilt, zoom, focus range, iris, parallax or convergence angle (for stereoscopic camera pairs), and camera-body separation (also for stereoscopic camera pairs).

Various embodiments assume that there are a broad variety of methods for measuring the operator's eye or head activity variables, and it is understood that the camera control methods and apparatus presented here may be implemented with any appropriate eye and/or head tracking equipment. Advanced video eyetrackers, for example, can measure both activity variables of both the eyes and the head.

It is desired to develop methods that allow the operator to keep his eyes focused on the subject matter while he is performing camera control operations. Further, it is an objective to make use of natural eye or head motions that people routinely perform when looking at objects with their own eyes. This rules out visually activating special eye-operated keys drawn at certain locations on the screen, because this would attract the eyes away from the real visual attention task.

When a person manipulates an object with his own hands, he typically moves his head to obtain an optimum view of his hands and the object he is manipulating. Similarly, when he manipulates an object remotely via a robot, he would like to be able to move the camera side to side, up and down, and/or forward and back, to obtain optimum viewing angles of the robot end effecter and work space. Since people naturally move their heads to control their own viewing angles, it is natural for them to move their heads to control a remote camera's viewing angle.

One approach for controlling the camera viewing angle is to provide the camera with position actuators that allow the camera to move (translate) right-left, up-down and forward-back. As the operator moves his head, the camera moves proportionately with it. This method, however, requires the operator to maintain a given positional perspective, he must maintain his head at a given location. That position may not be comfortable, or it might not be optimum for him to view the video screen, despite the camera's perspective on the work scene.

In various embodiments, an improved method allows the operator to keep his head within a small comfortable range while allowing the camera to move through a large range, and allowing the camera to remain fixed at any desired point throughout that range. In this method, the operator's head deviations from a reference point are translated into velocity commands to the camera's position actuators. If the operator positions his head to the right of the nominal "reference", or "resting" point, for example, the camera control system provides a velocity command to the camera position actuator that causes the camera to move at a velocity in proportion to the distance that the operator's head is positioned from the reference point. (Again, a dead zone, or a low-gain zone, allows the user some freedom of head movement without camera movement.)

In various embodiments, a gaze-controlled camera (GCC) allows a robot operator to control the robot's vision system. In a robot equipped with a GCC, the robot operator does not control the pan-tilt of the robot camera manually. Rather, a gaze-based control system commands the cameras automatically. The commands are based on the operator's natural eye activity as he observes the display while performing his task. No manual action, other than normal eye activity, is required to control the remote camera.

In various embodiments a GCC includes an eyetracker. The eyetracker, typically mounted below the operator display, uses one or more video cameras to observe the operator's eyes, and it continually calculates the coordinates of the operator's gazepoint within the display. Second, an automatic control system uses the operator's gazepoint activity to generate camera pan-tilt commands. When the user fixates on an object, the controller rotates the camera to center that object in the display.

GCC exploits two facts: 1) people naturally point their eyes at what they are interested in, and 2) their gaze is measurable by an unobtrusive instrument. By slaving the robot camera's pointing direction to the operator's eye as he observes the camera scene, the camera automatically rotates toward what the user wants to see—without the user having to take manual action. The operator drives the camera right, left, up, or down simply by doing what he does anyway—looking at the object he is interested in.

In various embodiments, a camera control algorithm can maintain a balance between two potentially conflicting goals. On the one hand, when the user is performing high precision work, the cameras must move slowly to maintain highly stable images. On the other hand, when the user wants to scan a wide area, i.e. shift his gaze by large angles, the camera must move rapidly. The algorithm balances these objectives by commanding the camera with angular velocities proportional to the angular offset of the operator's gaze with respect to the center of the display. When the user makes small eye rotations, the camera rotates slowly. When the user makes large eye rotations, the camera rotates quickly.

When a person uses a robot to perform a task, rather than using his hands to do the work directly, the robot adds two key elements of workload to the task. First, the indirect teleoperation of the robot makes it more difficult for the operator to maneuver within the environment and to manipulate objects. Second, if the robot has a camera providing remote vision, the operator has the additional task of controlling the direction the camera is pointed.

With a conventional operation of a remote camera on a robot, the operator typically controls the robot and the camera separately, alternately transferring his hands between robot and camera control panels. This "serial" operation of the two control tasks seriously slows task execution. In complex environments and/or while performing complex tasks, the camera control task can often generate as much physical and cognitive workload as operating the robot itself.

In various embodiments, GCCs can reduce the manual and cognitive workload of a robot operator. A GCC can eliminate the manual workload of controlling the robot camera, leaving the operator's hands free to operate the robot's body and manipulators. With his hands completely dedicated to controlling the robot body and manipulator, the operator can drive the robot continuously, without interruption from camera control.

A GCC can minimize the operator's cognitive workload. When a person performs a physical task without a robot, his conscious attention is (ideally) focused fully on the physical work at hand. While his visual activity during the task is absolutely essential to the success of his effort, the operator's actions of controlling his eye rotations do not add to the cognitive workload required for him to execute the task. A separate (but very powerful) portion of his brain handles the ocular control functions in parallel, without adding workload to the conscious part of the brain handling the central cognitive task.

On the other hand, when a person performs the same task with a robot, he has the added subtask of controlling the camera, i.e. controlling his remote eyes. In addition to using his built-in ocular control system to control his own eyes, he must use his hands to control the remote camera. In this case, the camera control does add cognitive workload, because the operator orchestrates the manual camera control functions using the same part of his brain that performs the robot control functions. In complex tasks, the additional vision-control workload can seriously interfere with the task's main cognitive workload, i.e. operating the robot and/or its manipulator.

In various embodiments, a GCC eliminates the cognitive workload associated with manual camera control. It directly harnesses the camera's pan-tilt control to the operator's own eye activity, exploiting the brain's existing ocular control functions to implement the remote camera control automatically. Rather than requiring the operator to use the conscious resources of his brain to execute remote vision control, GCC utilizes the brain's separate, unconscious ocular control function to do the job. Thus GCC not only relieves his hands from the camera control task, but also eliminates the cognitive workload associated with manual camera control. Without the distraction of manual camera control, the operator can concentrate his full attention on his ultimate task and, consequently, perform the task with fewer errors.

In various embodiments, gaze-controlled pan-tilt improves robot operation two ways: 1) eliminating manual camera-control workload improves task execution speed, and 2) eliminating cognitive camera-control workload reduces operator performance errors. Camera pan/tilt orientation is controlled by gaze direction, for example.

In various embodiments, camera control settings include camera zoom, focus range, parallax, camera-body separation, and iris diameter, in addition to pan and tilt. Due to the constraints of generating three-dimensional (3-D) images that are easily and properly perceived by the human visual system, controls for these parameters are highly inter-dependent. Options for operator control of these parameters include gaze pan/tilt, gaze parallax (indicative of gazepoint range), head position, and head pan/tilt.

In various embodiments, zoom control is accomplished by commanding image magnification based on the operator's longitudinal head position. An eyetracker measures the operator's head position with respect to a set point in the middle of the stereo display's eye box. If the user moves his head forward of the set point (or more likely forward of a dead zone around the set point), the lenses are given velocity commands to zoom in, and vice versa. This concept is based a person's natural tendency to move his head forward when he wants a closer look at something and to move his head back when he wants a wider perspective. Zoom factors for the two cameras, for example, must be programmed to match each other, so both eyes experience equal image magnification.

In various embodiments, camera parallax is made to match the operator's eye parallax to optimize the human's 3-D perception of the scene being viewed. That is, the tow-in angle between the two camera axes is controlled to match the tow-in angle between the visual axes of the operator's two eyes. Eye parallax is measured with a binocular version eyetracker, for example, and the camera controller computes camera parallax commands to follow the eyes' parallax. Camera parallax control is fully automatic—no conscious operator control, e.g. through head position or orientation, is required.

Given that the interocular distance between a person's eyes is fixed, matching the camera and eye parallax angles is geometrtically equivalent to matching relative object and image ranges. That is, if the camera and eye parallax angles are matched, the range of an object within the camera frame of reference is matched to the range of its image within the stereoscopic display frame.

In various embodiments, an algorithm for controlling camera parallax based on eye parallax is implemented as follows: If the operator's 3-D gaze point remains focused on an object or objects beyond the current camera convergence range, for example, the cameras are directed to converge further out. Bringing the camera convergence range in the real world into alignment with the eye convergence range within the display frame, brings the camera parallax into alignment with eye parallax. Using eye convergence range to control camera convergence range extends the concept of gazepoint control from 2-D (pan/tilt) to 3-D (pan/tilt/range).

In various embodiments, to mimic human eye operation, the focus ranges of the camera lenses are adjusted to match the equivalent range of the operator's gazepoint within the 3-D display. Based on the assumption that a human focuses his eyes at the same range where the two eyes' gaze lines converge, the control algorithm for the camera focus ranges makes the lens focus ranges follow the camera convergence range. With this embodiment, camera focus control is fully automatic—no conscious operator control, e.g. through head position or orientation, is required. Precise focus range control is required only with low-light, high-speed lenses that have short depth of field. With large depth of field, lens focus control only need be approximate to obtain adequate stereo images.

While a human cannot change the distance between his eyes, the robot could change the lateral distance between the two camera bodies, thereby changing the operator's apparent viewing distance. By moving the camera bodies further apart, for example, the stereo display makes it appear to the operator that he is moving in and viewing the scene from a position closer than the cameras really are.

In various embodiments, the camera's iris and/or the camera's illumination level on the scene is/are controlled by the user's pupil activity. A large eye pupil often indicates that the scene is under illuminated, and the eye dilates its pupil to accommodate low available light. Conversely, if the scene is very bright, the eye's pupil constricts to allow the retina to work with the high level of incident light. An eyetracker that measures the user's pupil diameter may direct the camera to adjust its iris and/or scene illuminator to provide optimum lighting conditions that permit comfortable pupil diameters. With this embodiment, a large eye pupil, indicating restricted light, directs the camera iris diameter to increase and/or causes the camera's illuminator to intensify. Conversely, a small pupil directs decreased iris diameter and/or decreased scene illumination. Similarly, pupil size may be used to control the display brightness—as well as the camera's iris or illumination control settings. A scene illuminator is, for example, a light source that is part of a video camera. In various embodiments, a scene illuminator can be a device that is separate from the video camera.

In various embodiments, camera-body separation is programatically tied directly to zoom for apparent distance viewing. As the user commands the camera lenses to zoom in, the camera bodies are simultaneously controlled to move apart. Increased zoom provides image enlargement, and the corresponding increased camera-body separation provides apparent range reduction (with respect to the fixed human interocular distance). In this embodiment, control of the camera body separation is fully automatic—no conscious operator control, e.g. through head position or orientation, is required.

It may prove useful, however, to allow the robot operator to control image magnification and apparent range separately rather than together. In this case, it may be more natural to use longitudinal head position to control apparent range (camera-body separation) and to use some other control, such as head tilt angle to control image amplification (zoom).

In various embodiments, all camera controls from the computer to the pan, tilt, zoom, focus, parallax and camera-body separation actuators, take the form of velocity commands. The sensor feedback required from the camera-control subsystem back to the computer are position signals indicating the current values of the individual control-variable states.

Figure 1:
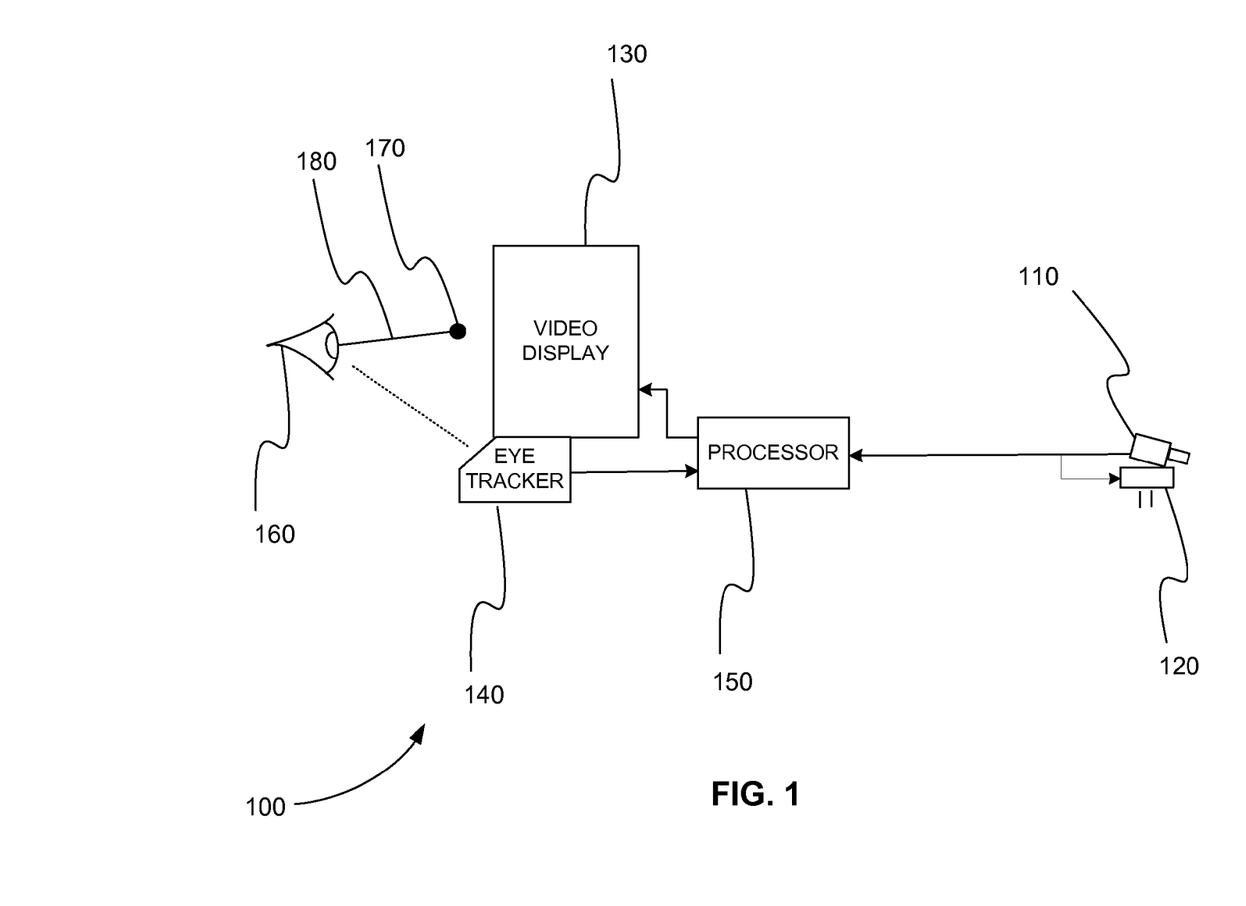
FIG. 1 is a schematic diagram of a system for remotely controlling a setting of a video camera, in accordance with various embodiments.

FIG. 1 is a schematic diagram of a system 100 for remotely controlling a setting of a video camera 110, in accordance with various embodiments. System 100 includes actuator 120, video display 130, eyetracker 140, and processor 150. Actuator 120 is physically connected to video camera 110 and controls at least one setting of video camera 110. Actuator 120 can be a mechanical device and/or an electronic device. Actuator 120 can be a separate device from video camera 110 or it can be integrated as part of video camera 110. Actuator 120 can include, for example, a gimbal mechanism and/or a slide mechanism to orient and position camera 110. Actuator 120 can also include a mechanism to control the zoom and focus of video camera 110. Actuator 120 can also include a mechanism to control the camera iris and/or the camera's scene illuminator.

Video display 130 displays video from video camera 110 to a user or operator of video camera 110. Video display 130 can be a computer screen, a television, a stereoscopic viewer if multiple cameras are used, or any other device capable of displaying a video signal from video camera 110.

Eyetracker 140, for example, can include one or more video cameras, an asymmetric aperture, a light source, a gimbal, and a processor, all of which are not shown in FIG. 1. Eyetracker 140 can also include video display 130.

Eyetracker 140 may measure a number of eye or head activity variables. At a minimum, eyetracker 140 images at least one of the user's eyes 160 over time as the user is observing video display 130, and measures the point of gaze 170 of eye 160 on or within video display 130. Additionally, eyetracker 140 may explicitly measure one, two or three coordinates of the position of one or both eyes 160 in space as the user moves his head around. Additionally, eyetracker 140 may explicitly measure the orientation of the eye(s) 160, or more specifically the eye's gaze vector orientation(s), as the user rotates his eyes as he looks around.

Eyetracker 140 may calculate the spatial position and/or orientation of the user's head (not shown) from the position(s) of the user's eye(s) 160. Spatial positions of the eye and/or head may include the horizontal, vertical and/or longitudinal locations with respect to the video display 130. Spatial orientations of the eye(s) 160 may be expressed in alternative ways, including vector directions or pan and tilt angles. Spatial orientation of the head may include pan, tilt and roll angles.

Eyetracker 140 may calculate gazepoint 170 as the extrapolation of the gaze line(s) 180 from the spatial location of the eye(s) 160. On a 2-dimensional display 130, the gazepoint 170 may computed as the intersection of the gaze line with the display surface. In stereoscopic, holographic, or 3-dimensional displays 130, a 3-dimensional gazepoint may be computed as the intersection of the gaze lines 180 from both eyes. (See gaze lines 596 and 597 converging on gazepoint 598 in FIG. 5). The gaze convergence or parallax may be computed by calculating the angle between the eye's two gaze lines. Finally, eyetracker 140 may measure the pupil diameter of eye(s) 160.

In summary, eyetracker 140 measurements may include, but are not limited to, eyeball location, eye gaze direction, gaze convergence or parallax, and eye pupil diameter. Head variables that can be calculated by Eyetracker 140 include, but are not limited to, head pan or tilt angle, head roll angle, head horizontal or vertical position, and head longitudinal position. Eyetracker 140 measures these eye or head variables whether the user changes them voluntarily or involuntarily.

Processor 150 is in communication with actuator 120, video display 130, eyetracker 140, and video camera 110. This communication can include, but is not limited to, wired or wireless data or control communication. Processor 150 can include, but is not limited to, a computer, a microcontroller, a microprocessor, an application specific integrated circuit (ASIC), a field programmable gate array (FPGA), or any device capable of executing a series of instructions. Processor 150 can be the same processor used by eyetracker 140 or it can be a separate device.

Processor 150 also performs a number of steps. Processor 150 translates the eye and/or head activity variable(s) calculated by eyetracker 140 into their camera control setting(s) that drive video camera 110. Processor 150 then instructs actuator 140 to respond to the control setting(s) for video camera 110.

The control settings that processor 150 may provide to video camera 110 include, but are not limited to, the pan or tilt angle of video camera 110, the roll angle of video camera 110, the horizontal or vertical position of video camera 110, the longitudinal position of video camera 110, the zoom percentage of video camera 110, the focus of video camera 110, the iris of video camera 110, and illumination or light intensity produced by video camera 110.

Figure 2:
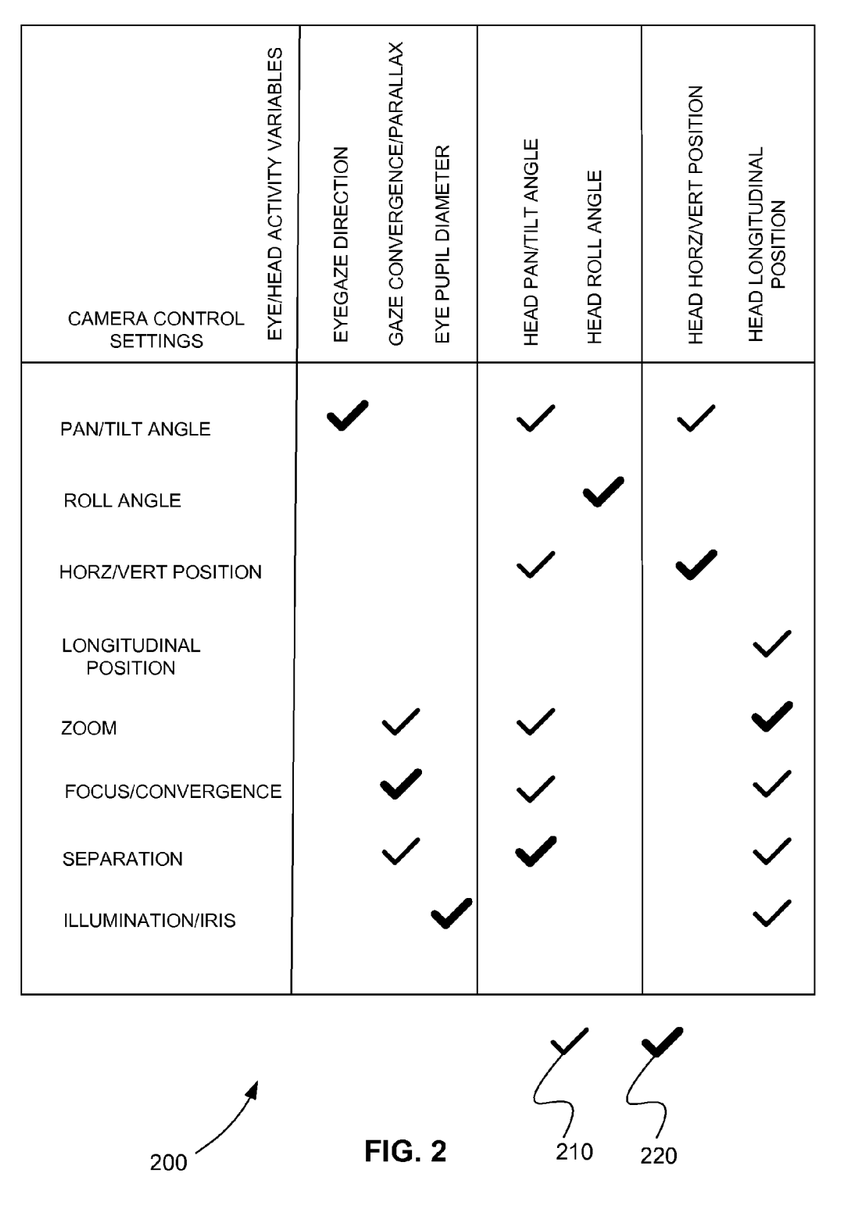
FIG. 2 shows a matrix of possible eye or head activity variables that an eyetracker can measure from its user, versus as set of alternative camera control settings that can be used to control a remote video camera, in accordance with various embodiments.

FIG. 2 shows a matrix 200 of possible eye or head activity variables that an eyetracker can measure from its user, versus as set of alternative camera control settings that can be used to control a remote video camera, in accordance with various embodiments. Unbolded checkmarks 210 identify eye/head variables that could reasonably be used to control various camera variables. Bolded checkmarks 220 identify the preferred eye/head variables used to drive the various camera control-variable settings.

Figure 3:
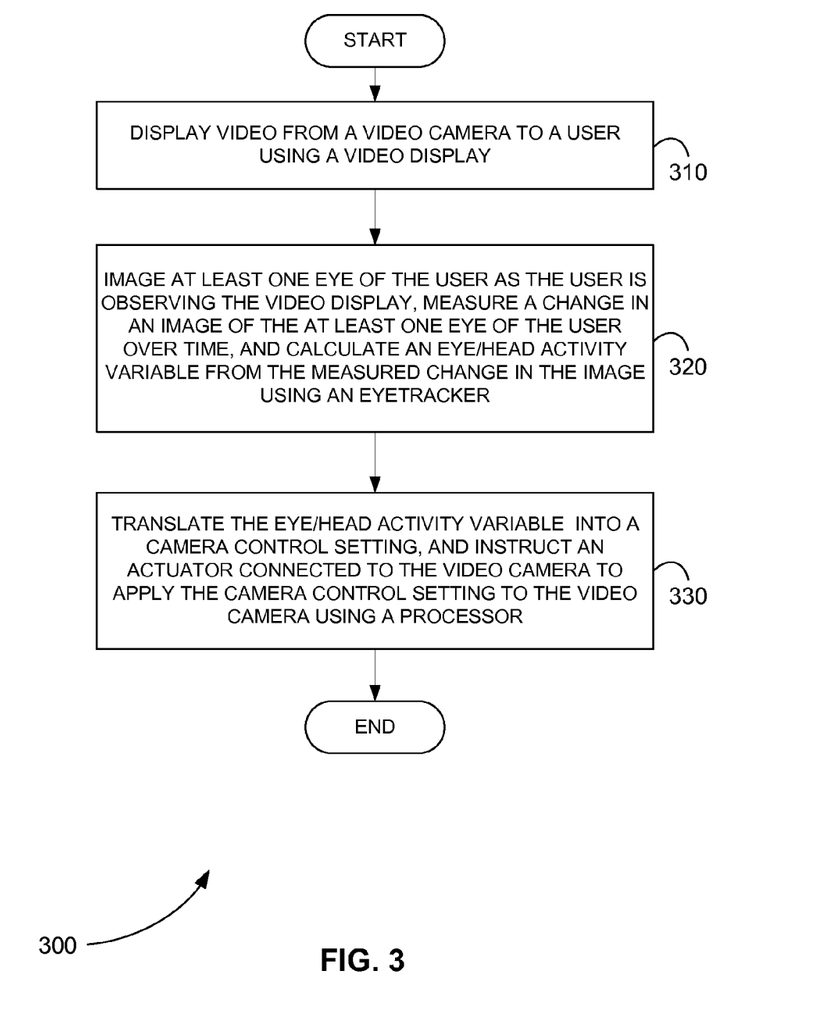
FIG. 3 is a flowchart showing a method for remotely controlling a setting of a video camera, in accordance with various embodiments.

FIG. 3 is a flowchart showing a method 300 for remotely controlling a setting of a video camera, in accordance with various embodiments.

In step 310 of method 300, video from a video camera is displayed to a user using a video display.

In step 320, at least one eye of the user is imaged as the user is observing the video display, a change in an image of the at least one eye of the user is measured over time, and an eye/head activity variable is calculated from the measured change in the image using an eyetracker.

In step 330, the eye/head activity variable is translated into a camera control setting, and an actuator connected to the video camera is instructed to apply the camera control setting to the video camera using a processor.

In accordance with various embodiments, instructions configured to be executed by a processor to perform a method are stored on a computer-readable storage medium. The computer-readable storage medium can be a device that stores digital information. For example, a computer-readable storage medium includes a compact disc read-only memory (CD-ROM) as is known in the art for storing software. The computer-readable storage medium is accessed by a processor suitable for executing instructions configured to be executed.

In various embodiments, a computer program product includes a tangible computer-readable storage medium whose contents include a program with instructions being executed on a processor so as to perform a method for remotely controlling a setting of a video camera. This method is performed by a system of distinct software modules.

Figure 4:
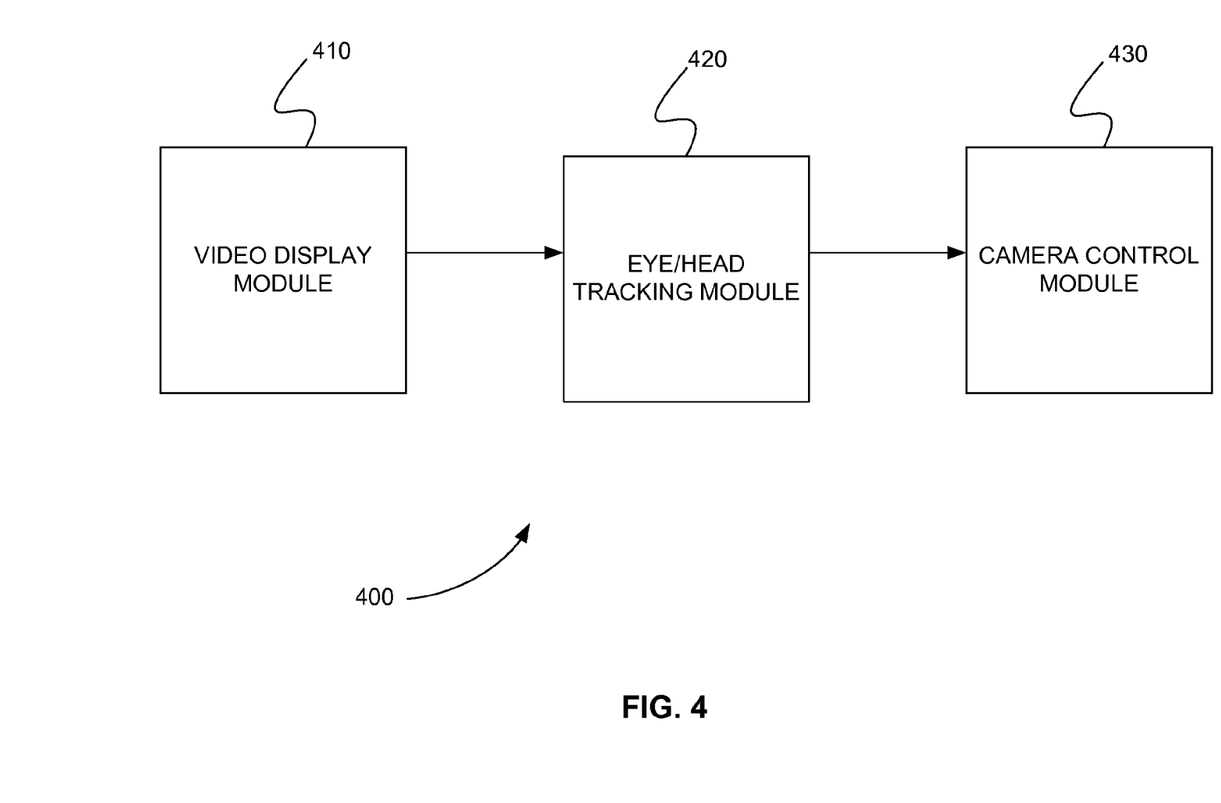
FIG. 4 is a schematic diagram of a system of distinct software modules that performs a method for remotely controlling a setting of a video camera, in accordance with various embodiments.

FIG. 4 is a schematic diagram of a system 400 of distinct software modules that performs a method for remotely controlling a setting of a video camera, in accordance with various embodiments. System 400 includes video display module 410, eye tracking module 420, and camera control module 430. Video display module 410 displays video from a video camera to a user on a video display.

Eye tracking module 420 performs a number of steps. Eye tracking module 420 images at least one eye of the user with an eyetracker as the user is observing the video display. Eye tracking module 420 measures a change in an image of the at least one eye of the user over time. Finally, eye tracking module 420 calculates an eye/head activity variable from the measured change in the image.

Camera control module 430 also performs a number of steps. Camera control module 430 translates the eye/head activity variable into a camera control setting. Then, camera control module 430 instructs an actuator connected to the video camera to apply the camera control setting to the video camera.

Remote Three-Dimensional Target Location

Remote video sensors allow observers to see and detect targets without personally being on the scene. A key limitation of current remote display systems is that the observer often cannot see a target in a three-dimensional (3-D) space. 3-D information is critical for determining the range to a target.

In various embodiments, systems and methods are described for determining the range or 3-D location of a target simply by looking at it within a remote 3-D display. A stereo imager generates a 3-D image from a pair of cameras viewing the real scene. As the user scans the 3-D image of the scene, the 3-D location of his equivalent gazepoint within the real scene is computed quantitatively, automatically and continuously using an eyetracker. If the user wishes to designate a target, he fixes his gaze on its image and activates a switch or speaks a keyword. The location data for the actual target in real space is then recorded and passed to a client application, for example.

Animals use binocular vision to determine the 3-D locations of objects within their environments. Loosely speaking, the horizontal and vertical coordinates of the object within the viewer's space are determined from the orientation of the head, the orientation of the eyes within the head, and the position of the object within the eyes' two-dimensional (2-D) images. The range coordinate is determined using stereopsis: viewing the scene from two different locations allows the inference of range by triangulation.

Though humans implicitly use 3-D target location information to guide the execution of their own physical activities, they have no natural means for exporting this information to their outside world. In various embodiments, quantitative 3-D target-location information is extracted from a person based on the observable behavior of his eyes. A human's natural behavior of looking at targets of interest is exploited. Rapid target designation is obtained with a single, simple command, and the need for manual manipulation or pointing of equipment in the computation of the target location is eliminated.

In various embodiments, an eye-operated 3-D targeting system includes an eyetracker and a stereoscopic display or viewer. Two video cameras view the real scene from two different locations. A stereoscopic viewer converts the two camera video signals into a scaled 3-dimensional image of the real scene. The operator views the 3-D image space with both eyes. A binocular eyetracker monitors both the user's eyes as he views the stereoscopic or holographic 3-D display, and it continuously computes the gaze lines of the two eyes within the 3-D image space. The intersection of the two gaze lines is computed to be the user's 3-D gazepoint within the image space. Based on the known locations and orientations of the two cameras, the 3-D gazepoint within the image scene is mathematically transformed (using formulas well known in the art) to the equivalent 3-D location of the target being observed in real space. As the user looks around the scene, the system continuously computes the 3-D location of the user's gazepoint.

Generally, due to noise inherent in the eye tracking system, the two measured gaze lines do not precisely intersect with each other. For computational purposes, the 3-D intersection point may be taken to be the point in space where the two measured gaze lines come closest to one another.

Due to the fixed distance between his eyes, two key limitations arise in the human's ability to measure range. At long ranges beyond about 20 feet, the gaze lines of both eyes become virtually parallel, and triangulation methods become inaccurate. (Animals infer longer range from environmental context queues.) Conversely, at short ranges below about six inches, it is difficult for the eyes to converge.

In various embodiments, a 3-D target range finding system allows accurate measurement over a wide range of distances by using variable camera separations. Long ranges are measured with widely separated cameras, and short ranges are measured with closely separated cameras. In aerial targeting applications, for example, long ranges can be measured by placing the two cameras on different flight vehicles. The vehicles may be separated as needed to provide accurate range information. In small-scale applications, such as surgery, miniature cameras mounted close to the surgical instrument allows accurate 3-D manipulation of the instrument.

In various embodiments, where it is desired to determine the location of a specific target, the user may designate the target by fixing his gaze on it and activating a switch or verbalizing a keyword. At the time of the designation, a 3-D target range finding system samples the 3-D gazepoint location for use by the client application.

Velocities, directions, and accelerations of moving targets may also be measured if the user keeps his gaze fixed on the target as it moves. To implement measurement of target velocity, direction, and/or accelerations, the 3-dimensional target location system stores the time history of the user's equivalent gazepoint location in real space. The target velocity, direction, and/or acceleration may be computed by appropriate (well known) mathematical calculations on the point motion history. At least two successive time points are needed to calculate target velocity and direction, and three points are required to calculate acceleration.

A 3-D target range finding system is passive. There is no active range-finding sensor such as a laser or radar that may be detected by the enemy. The operator does not have to be at the scene or near the cameras. He may operate at a remote workstation. Cameras can protect the operator's eyes from exposure to dangerous lighting conditions.

Figure 5:
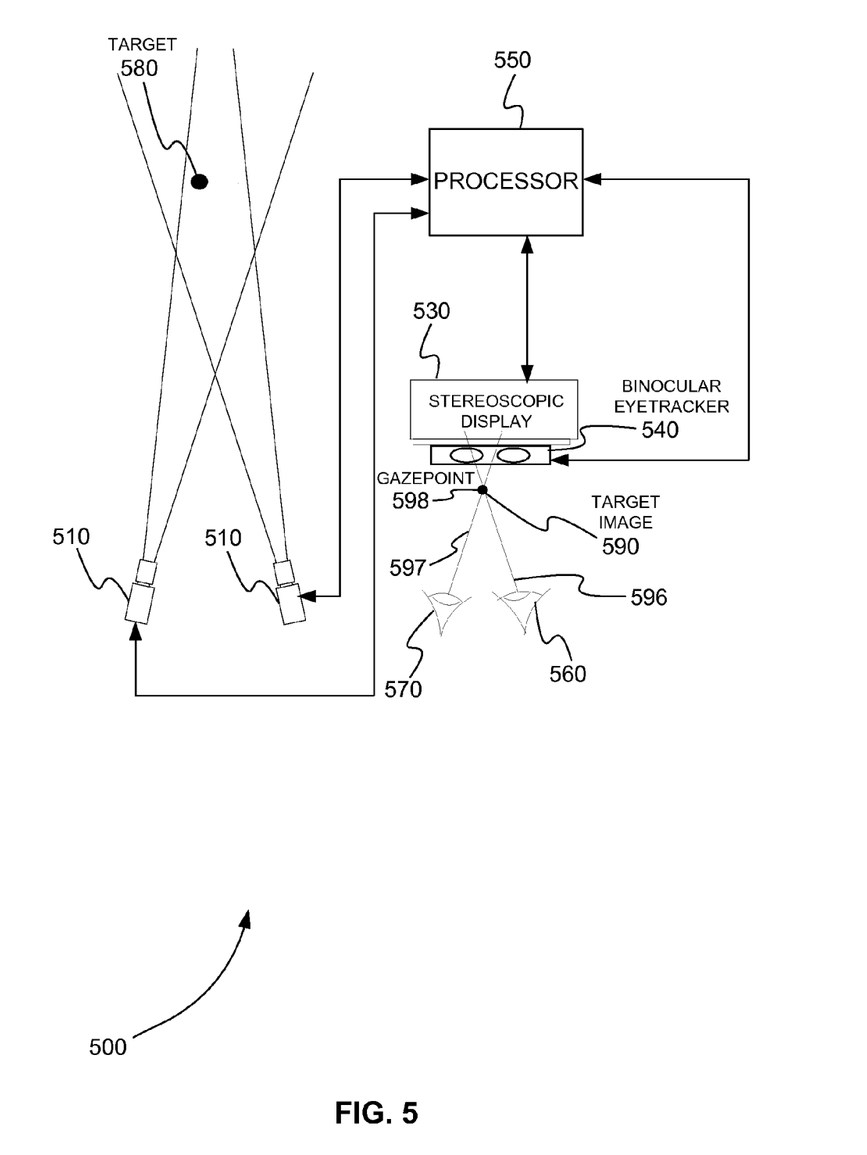
FIG. 5 is a schematic diagram of a system for remotely determining the location of a target in a three-dimensional real space, in accordance with various embodiments.

FIG. 5 is a schematic diagram of a system 500 for remotely determining the location of a target in a three-dimensional real space, in accordance with various embodiments. System 500 includes two or more video cameras 510, stereoscopic display 530, binocular eyetracker 540, and processor 550. Two or more video cameras 510 image target 580 in a three-dimensional real space.

Stereoscopic display 530 is, for example, a video display as described above that can display three-dimensional images. Stereoscopic display 530 renders the video signals from the two cameras 510 to present the user with what appears to him as a three-dimensional image. The view to the user appears as if each of his two eyes were located at the real locations of the two cameras in the real environment.

Binocular eyetracker 540 is an eyetracker as described above that includes at least two video cameras that are used to track both eyes of the user. Binocular eyetracker 540 performs a number of steps. Binocular eyetracker 540 images right eye 560 and a left eye 570 of the user as the user is observing target image 590 in stereoscopic video display 510. Binocular eyetracker 540 calculates right gaze line 596 of right eye 560 and left gaze line 597 of left eye 570 in the three-dimensional image space. Finally, binocular eyetracker 540 calculates gazepoint 598 in the three-dimensional image space as the intersection of right gaze line 596 and the left gaze line 597.

Processor 550 is in communication with two or more video cameras 510, stereoscopic display 530, and binocular eyetracker 540. Processor 550 is a processor as described above.

Processor 550 also performs a number of steps. Processor 550 calculates the image target location in the three-dimensional image space from gazepoint 598. Processor 550 then determines the real target location by translating the image target location to the real target location in the three-dimensional real space from the locations and positions of two video cameras 510.

In various embodiments, system 500 can include an actuator (not shown) in communication with processor 550 and connected to at least one of the two video cameras 510. The actuator can change the relative distance between the two video cameras 510 at the request of processor 550. For example, processor 550 can instruct the actuator to increase the relative distance to determine the real target location at longer ranges. Alternatively, processor 550 can instruct the actuator to decrease the relative distance to determine the real target location at shorter ranges.

In various embodiments, processor 550 selects two video cameras 510 from the two or more video cameras based the relative distance between two video cameras 510. For example, processor 550 can select two video cameras with a larger relative distance to determine the real target location at longer ranges. Alternatively, processor 550 can select two video cameras with a smaller relative distance to determine the real target location at shorter ranges.

In various embodiments, processor 550 can calculate a velocity, acceleration, or direction of target 580 from two or more real target positions determined over time.

Figure 6:
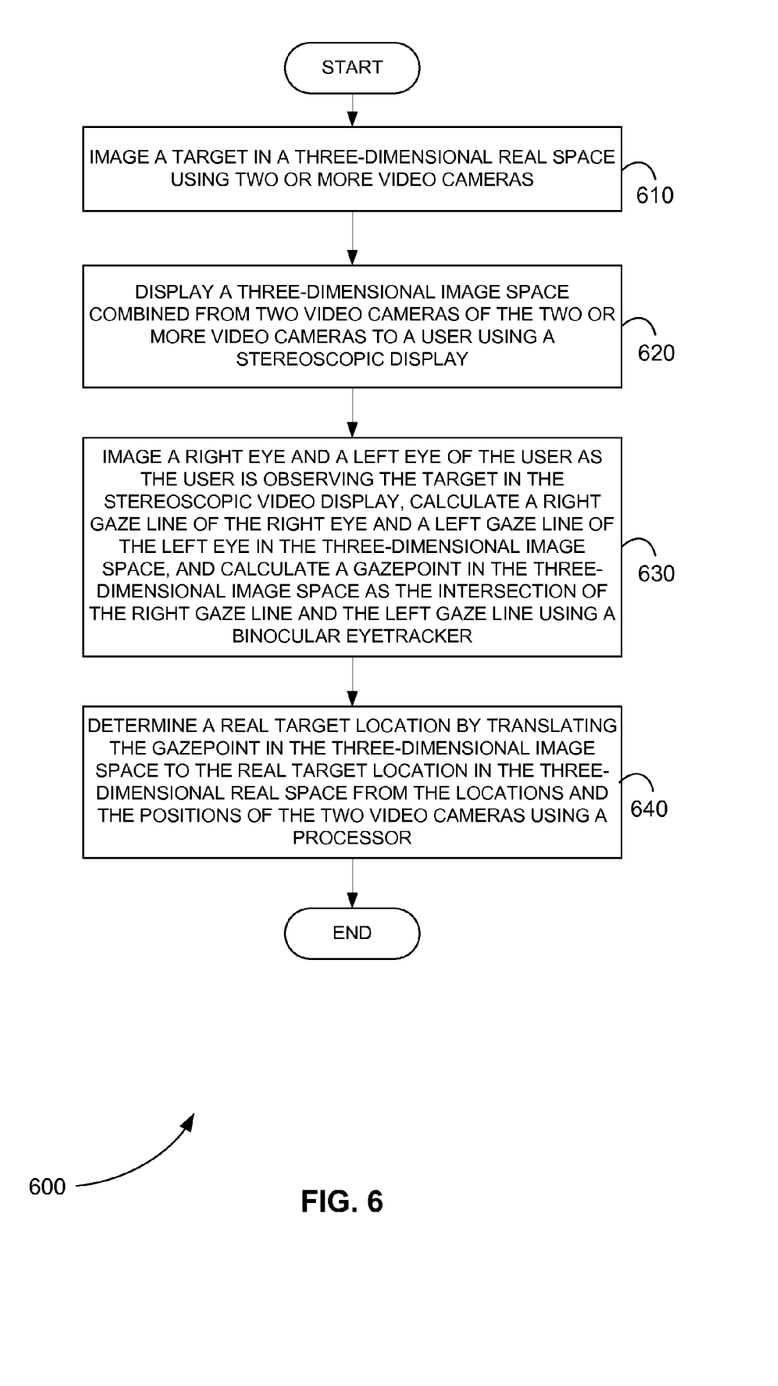
FIG. 6 is a flowchart showing a method for remotely determining the location of a target in a three-dimensional real space, in accordance with various embodiments.

FIG. 6 is a flowchart showing a method 600 for remotely determining the location of a target in a three-dimensional real space, in accordance with various embodiments.

In step 610 of method 600, a target is imaged in a three-dimensional real space using two or more video cameras.

In step 620, a three-dimensional image space combined from two video cameras of the two or more video cameras is displayed to a user using a stereoscopic display.

In step 630, a right eye and a left eye of the user are imaged as the user is observing the target in the stereoscopic video display, a right gaze line of the right eye and a left gaze line of the left eye are calculated in the three-dimensional image space, and a gazepoint in the three-dimensional image space is calculated as the intersection of the right gaze line and the left gaze line using a binocular eyetracker.

In step 640, a real target location is determined by translating the gazepoint in the three-dimensional image space to the real target location in the three-dimensional real space from the locations and the positions of the two video cameras using a processor.

In various embodiments, a computer program product includes a tangible computer-readable storage medium whose contents include a program with instructions being executed on a processor so as to perform a method for remotely determining the location of a target in a three-dimensional real space. This method is performed by a system of distinct software modules.

Figure 7:
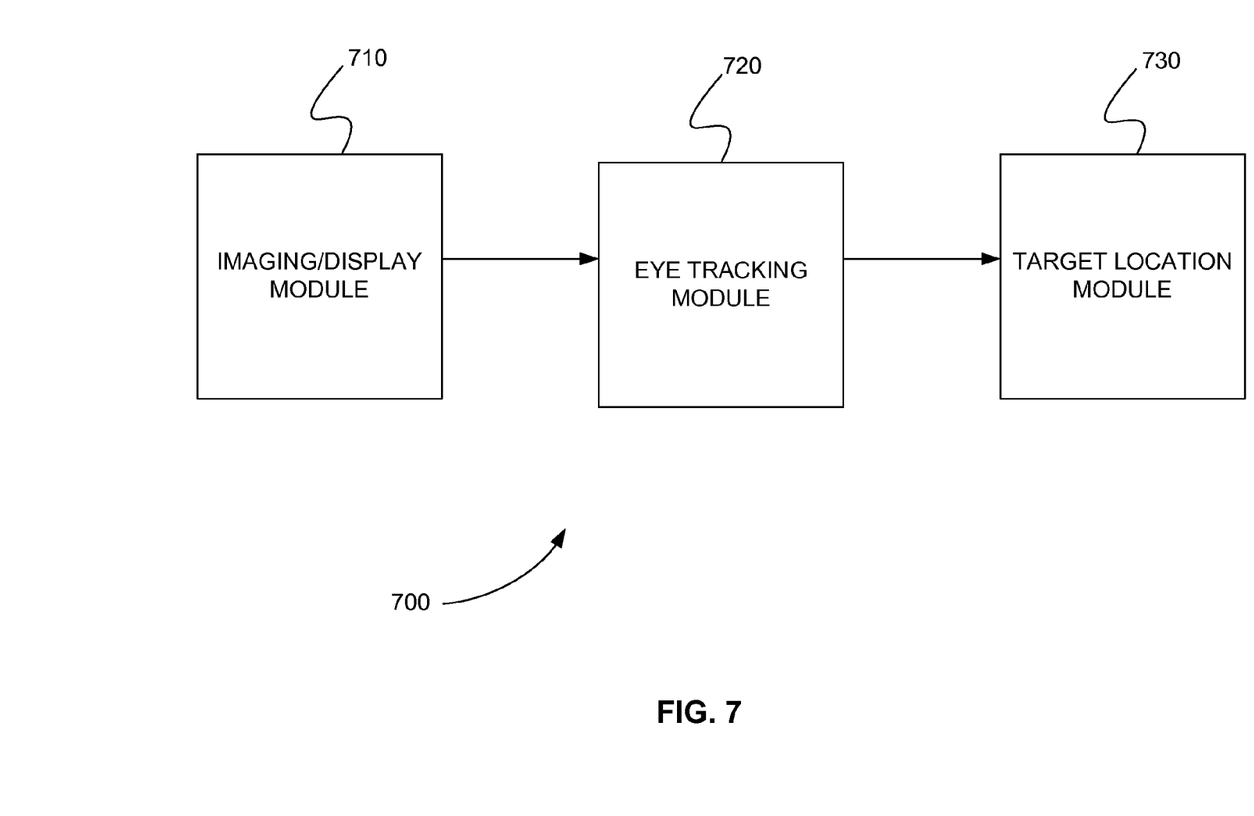
FIG. 7 is a schematic diagram of a system of distinct software modules that performs a method for remotely determining the location of a target in a three-dimensional real space, in accordance with various embodiments.

FIG. 7 is a schematic diagram of a system 700 of distinct software modules that performs a method for remotely determining the location of a target in a three-dimensional real space, in accordance with various embodiments. System 700 includes imaging/display module 710, eye tracking module 720, and target location module 730.

Imaging/display module 710 images a target in a three-dimensional real space with two or more video cameras. Imaging/display module 710 also displays a three-dimensional image space combined from two video cameras of the two or more video cameras to a user on a stereoscopic display.

Eye tracking module 720 performs a number of steps. Eye tracking module 720 images a right eye and a left eye of the user with a binocular eyetracker as the user is observing the target in the stereoscopic video display. Eye tracking module 720 calculates a right gaze line of the right eye and a left gaze line of the left eye in the three-dimensional image space. Finally, eye tracking module 720 calculates a gazepoint in the three-dimensional image space as an intersection of the right gaze line and the left gaze line.

Target location module 730 determines a real target location by translating the gazepoint in the three-dimensional image space to the real target location in the three-dimensional real space from locations and positions of the two video cameras.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for remotely determining the location of a target in a three-dimensional real space, comprising:
   two or more video cameras that image a target in a three-dimensional real space;
   a stereoscopic display that displays a three-dimensional image space combined from two video cameras of the two or more video cameras to a user;
   a binocular eyetracker that images a right eye and a left eye of the user as the user is observing the target in the stereoscopic video display, calculates a right gaze line of the right eye and a left gaze line of the left eye in the three-dimensional image space, and calculates a gazepoint in the three-dimensional image space as an intersection of the right gaze line and the left gaze line; and
   a processor that is in communication with the two or more video cameras, the stereoscopic display, and the binocular eyetracker and that determines a real target location by translating the gazepoint in the three-dimensional image space to the real target location in the three-dimensional real space from locations and positions of the two video cameras and calculates an acceleration of the target from three or more real target positions determined over time.

2. The system of claim 1, further comprising an actuator connected to the processor and at least one video camera of the two video cameras that controls a relative distance between the two video cameras.

3. The system of claim 2, wherein the processor instructs the actuator to increase or decrease the relative distance between the two cameras to determine the real target location at longer or shorter ranges respectively.

4. The system of claim 1, wherein the processor selects the two video cameras of the two or more video cameras based on the relative distance between the two video cameras.

5. The system of claim 4, wherein the processor selects two video cameras with larger or smaller relative distances to determine the real target location at longer or shorter ranges respectively.

6. The system of claim 1, wherein the processor calculates a velocity of the target from two or more real target positions determined over time.

7. The system of claim 1, wherein the processor calculates a direction of the target from two or more real target positions determined over time.

8. The system of claim 1, further comprising a switch that is activated by the user to designate a target identified by the gazepoint to a client application.

9. The system of claim 1, further comprising a microphone that receives a keyword from the user to designate a target identified by the gazepoint to a client application.

10. A method for remotely determining the location of a target in a three-dimensional real space, comprising:
    imaging a target in a three-dimensional real space using two or more video cameras;
    displaying a three-dimensional image space combined from two video cameras of the two or more video cameras to a user using a stereoscopic display;
    imaging a right eye and a left eye of the user as the user is observing the target in the stereoscopic video display, calculating a right gaze line of the right eye and a left gaze line of the left eye in the three-dimensional image space, and calculating a gazepoint in the three-dimensional image space as an intersection of the right gaze line and the left gaze line using a binocular eyetracker;
    determining a real target location by translating the gazepoint in the three-dimensional image space to the real target location in the three-dimensional real space from locations and positions of the two video cameras using a processor, and
    calculating an acceleration of the target from three or more real target positions determined over time using the processor.

11. The method of claim 10, further comprising instructing an actuator to increase or decrease the relative distance between the two cameras to determine the real target location at longer or shorter ranges respectively using the processor.

12. The method of claim 10, further comprising selecting the two video cameras of the two or more video cameras based on the relative distance between the two video cameras using the processor.

13. The method of claim 12, selecting the two video cameras of the two or more video cameras comprises selecting two video cameras with larger or smaller relative distances to determine the real target location at longer or shorter ranges respectively using the processor.

14. The method of claim 10, further comprising calculating a velocity of the target from two or more real target positions determined over time using the processor.

15. The method of claim 10, further comprising calculating a direction of the target from two or more real target positions determined over time using the processor.

16. The system of claim 1, further comprising designating a target identified by the gazepoint to a client application when a switch is activated by the user using the processor.

17. The method of claim 1, further comprising designating a target identified by the gazepoint to a client application when a microphone receives a keyword from the user using the processor.

18. A computer program product, comprising a tangible computer-readable storage medium whose contents include a program with instructions being executed on a processor so as to perform a method for determining the location of a target in a three-dimensional real space, the method comprising:
    providing a system, wherein the system comprises distinct software modules, and wherein the distinct software modules comprise an imaging/display module, an eye tracking module, and a target location module;
    imaging a target in a three-dimensional real space with two or more video cameras using the imaging/display module;
    displaying a three-dimensional image space combined from two video cameras of the two or more video cameras to a user on a stereoscopic display using the imaging/display module;
    imaging a right eye and a left eye of the user with a binocular eyetracker as the user is observing the target in the stereoscopic video display, calculating a right gaze line of the right eye and a left gaze line of the left eye in the three-dimensional image space, and calculating a gazepoint in the three-dimensional image space as an intersection of the right gaze line and the left gaze line using the eye tracking module;
    determining a real target location by translating the gazepoint in the three-dimensional image space to the real target location in the three-dimensional real space from locations and positions of the two video cameras using the target location module, and
    calculating an acceleration of the target from three or more real target positions determined over time using the target location module.

* * * * *